US006850266B1

(12) United States Patent
Trinca

(10) Patent No.: US 6,850,266 B1
(45) Date of Patent: Feb. 1, 2005

(54) PROCESS FOR CARRYING OUT VIDEOCONFERENCES WITH THE SIMULTANEOUS INSERTION OF AUXILIARY INFORMATION AND FILMS WITH TELEVISION MODALITIES

(76) Inventor: Roberto Trinca, Via Casetta Mattei, 151 - I - 00148 Roma (IT)

( * ) Notice: Subject to any disclaimer, the term of this patent is extended or adjusted under 35 U.S.C. 154(b) by 0 days.

(21) Appl. No.: 09/701,794
(22) PCT Filed: Jun. 4, 1998
(86) PCT No.: PCT/IT98/00149
§ 371 (c)(1),
(2), (4) Date: Dec. 4, 2000
(87) PCT Pub. No.: WO99/63756
PCT Pub. Date: Dec. 9, 1999

(51) Int. Cl.[7] ................................................ H04N 7/14
(52) U.S. Cl. .................................. 348/14.09; 348/14.12
(58) Field of Search .......................... 348/14.01–14.04, 348/14.06–14.09, 14.1, 14.11–14.13; 399/202.01; 370/260–261; 709/204; 725/106, 115–116

(56) References Cited

U.S. PATENT DOCUMENTS

| 5,537,141 | A |   | 7/1996 | Harper et al. | ................ 725/116 |
| 5,600,646 | A | * | 2/1997 | Polomski | ..................... 370/263 |
| 5,710,591 | A | * | 1/1998 | Bruno et al. | ............. 348/14.09 |
| 6,124,880 | A | * | 9/2000 | Shafiee | ..................... 348/14.08 |

FOREIGN PATENT DOCUMENTS

| EP | 0 619 679 | | 10/1994 | | |
| EP | 619679 | A1 * | 10/1994 | ............ | H04N/7/15 |
| EP | 0 632 659 | | 1/1995 | | |
| GB | 2 313 251 | | 11/1998 | | |
| JP | 08251566 | A * | 9/1996 | ............ | H04N/7/15 |
| JP | 08297624 | A * | 11/1996 | ........... | G06F/13/00 |
| WO | WO 98/23075 | | 5/1998 | | |
| WO | WO 9823075 | A2 * | 5/1998 | | |

OTHER PUBLICATIONS

M.J. Koenig et al., "MCUs Help Take the Worry Out of Being There (AT&T Videoconferencing Multipoint Control Unit)", AT&T Technology, Winter 1994, USA, vol. 9, No. 4, pp. 12–15.

C. Bisdikian et al., "Multimedia Digital Conferencing: A Web Enabled Multimedia Teleconferencing System", IBM Journal of Research and Development, Mar. 1998, USA, vol. 42, No. 2, pp. 281–298.

T. Wong et al., "Software–Only Video Production Switcher for the Internet MBone", Multimedia Computing and Networking 1998, San Jose, CA, USA, Jan. 26–28, 1998, vol. 3310, pp. 28–39.

Lung–Sing Liang et al., "Design Implementation and Performance Measurement of Mult–Point Video–Conference Bridge (MPVCB) Over ATM Switch", Serving Humanity Through Communications. Supercom/ICC, New Orleans, May 1–5, 1994, vol. 3, pp. 1478–1482.

* cited by examiner

Primary Examiner—George Eng
(74) Attorney, Agent, or Firm—Young & Thompson

(57) ABSTRACT

A process for carrying out and managing a videoconference among remote and/or local users includes the steps of linking a direction room with a plurality of user locations at which a signal of the audio video type originates, converting the audiovisual signal from each location before its transfer to the direction room so as to make it suitable to the type of connection and transmission which are being utilized, prior to use of the received signals at the direction room converting the signal into a common audio video format, selecting the signals to send to the user locations with an input audio video matrix, adding the necessary audio and video effects, titles, soundtracks, comments, images, graphs, etc. with a mixer, and sending the combined signals to the user locations.

5 Claims, 2 Drawing Sheets

PROCESS FOR CARRYING OUT VIDEOCONFERENCES WITH THE SIMULTANEOUS INSERTION OF AUXILIARY INFORMATION AND FILMS WITH TELEVISION MODALITIES

BACKGROUND OF THE INVENTION

The present invention relates to the field of multimedia communications, and more particularly a process and apparatus therefor for videoconferences that provides link-ups among several attendants and with extremely variable characteristics and modalities, adaptable to any specific need of the user.

Currently, multiple user videoconference apparati and techniques are known, and despite being based on different execution parameters, they make the choice of the image to be shown to the attendants on the grounds of the audio signal coming from the attendants themselves, which is technically called "audio presence".

In other words, the sound received by the microphone located at every equipped location gets to the centralised videoconference management device. This device shows all the attendants the image of the user that has generated the sound impulse. In such a way, all the attendants receive the image of the person that is speaking at that precise moment of time on their screens. It is therefore clear that if two or more users speak at the same time, the conference management device carries out image commutations on a continuous basis, causing considerable disruptions and chaos all along the course of the videoconference itself.

Attention is also drawn to the fact that a user is allowed into a dialogue which has already started, even because of a background noise from his own environment, which could be completely independent from his will but is detected by the microphone located at his place.

Currently, in order to resolve such problems, it is necessary to turn off one's own microphone (but this risks turning an interesting debate into an endless monologue).

This type of automatic commutation caused by the audio presence, necessarily requires the presence of an interpreter next to each single attendant, in case of videoconferences that involve people speaking different languages.

Besides this, current technology does not always provide carrying out a link-up between different videocommunication systems. The apparati which are currently being used in fact only allow file transmission and/or sharing just in case the link-up devices of the several attendants are made by the same manufacturer, in so doing drastically limiting the possibilities of employment of the system itself (file sharing, transmission and transfer, etc.).

A further problem of the prior art is given by the fact that the possibility of executing fadings among the images of the speakers that make their contributions along the way, and possible audio-video contributions, whether they be films, photographs, static images, graphs and so on, is ruled out.

A further disadvantage of the currently viable videoconferences, is given by the fact that it is not possible to superimpose titles, subtitles, abbreviations, speakers' names, musical themes and soundtracks, and all audio and video effects that can make of a "flat" and static videoconference a real television programme.

In this respect, it is useful to observe that said problems and drawbacks have not only got purely aesthetic consequences, but they also cause a rapid decrease in the level of attention of the attendants, which is an extremely important factor for the success of a conference of whatever type.

It is also Known, from EP-A-0619679, a multi-location television conference system that connects five locations A, B, C, D, and E, when speeches take place at the four locations A, B, C, and D at the same time, at a listening location E, images of all the speaking locations A, B, C, and D are displayed on one screen with four divided screen areas. On the other hand, at the speaking location A, images of the speaking locations B, C, and D and an image of the former speaking location E are displayed on one screen with four divided screen areas. In addition, when images of speaking locations are displayed, locations names thereof are also displayed. Thus, a television conference held at a plurality of locations at a time can be smoothly managed as with a real conventional conference.

A first disadvantage of this conference system is that it does not allow the connection among systems having different transmission protocols, different type of signals or different technologies.

A second disadvantage of EP-A-0619679 is that said limitations prevent the simultaneous connection and use of quite different transmission channels such as satellite, computer network, telephone lines, internet, and so on.

A third disadvantage of EP-A-0619679, is that the information that can be displayed on the screen of each user, by superimposition with the images of the most recent speaker/s, are very limited and require the use and the creation of identification codes.

A fourth disadvantage of EP-A-0619679 is that it does not provide means for substitute the audio signal of one or more user with the audio signal coming from a simultaneous-translation room that translate, in real-time, the discourse of the speaker in that of the user.

Another disadvantage of the system disclosed in EP-A-0619679 is that the switching of the images displayed is submitted to the detection of an audio signal.

SUMMARY OF THE INVENTION

A first aim of the present invention is that of allowing the course of videoconferences (congresses, debates, presentations, lectures, etc.) with the utilization of audiovisual contributions such as films, slides, photographs, animated computer aided design, graphs, music and/or soundtracks etc.

A second aim of the present invention is that of guaranteeing an orderly and fluent course of a videoconference, thanks to the audio-visual commutations carried out by the operators of the direction room, and by the possible presence of a chairperson, who is meant to allow the user to personally take part in the debate, only at the most suitable moment.

A third aim of the present invention is that of giving the possibility to attend a conference even to Internet users. Furthermore, through a series of procedures and suitable links, which will be analysed in detail in the foregoing, giving the possibility to any single spectator who is suitably equipped to directly enter and take part in the conference, contributing to it with his own image and his own audio (even if not originally scheduled).

A fourth aim of the present invention is that of guaranteeing compatibility between different videocommunication systems, utilising the most suitable interfaces and transforming the ensemble of the videoconference into many point-point links (user-direction) with personalised characteristics and communication protocols.

To this purpose attention is drawn to the fact that attendants, whether they be interactive or not, can be both remote and local and numberwise limitless.

These and other aims have been accomplished according to the invention, by proposing a process and an apparatus for the production and management of videoconferences, wherein audiovisual signals coming from a plurality of remote and/or neighbour locations, are acquired and elaborated by a direction room capable of dealing with and selecting both the audio and the video signal, adding audiovisual contributions like television effects, partial or total image superimposition, insertion of graphs, tables, films or soundtracks, audio commentaries, and so on.

According to the process and the apparatus which are herein described, it is also possible to provide a centralised interpretation service, discriminating on the audio supplied by the users as a function of their language.

BRIEF DESCRIPTION OF THE DRAWINGS

A better understanding of the present invention will be gained thanks to the following detailed description with reference to the appended drawings, which schematically illustrate a preferred embodiment of the invention.

In the drawings:

FIG. 2 is a scheme illustrating the modalities and possibilities of link-up between the direction room and remote and/or neighbour users, by use of telephone lines, via satellite, via Internet, and so on.

DESCRIPTION OF THE PREFERRED EMBODIMENTS

Figure 1:
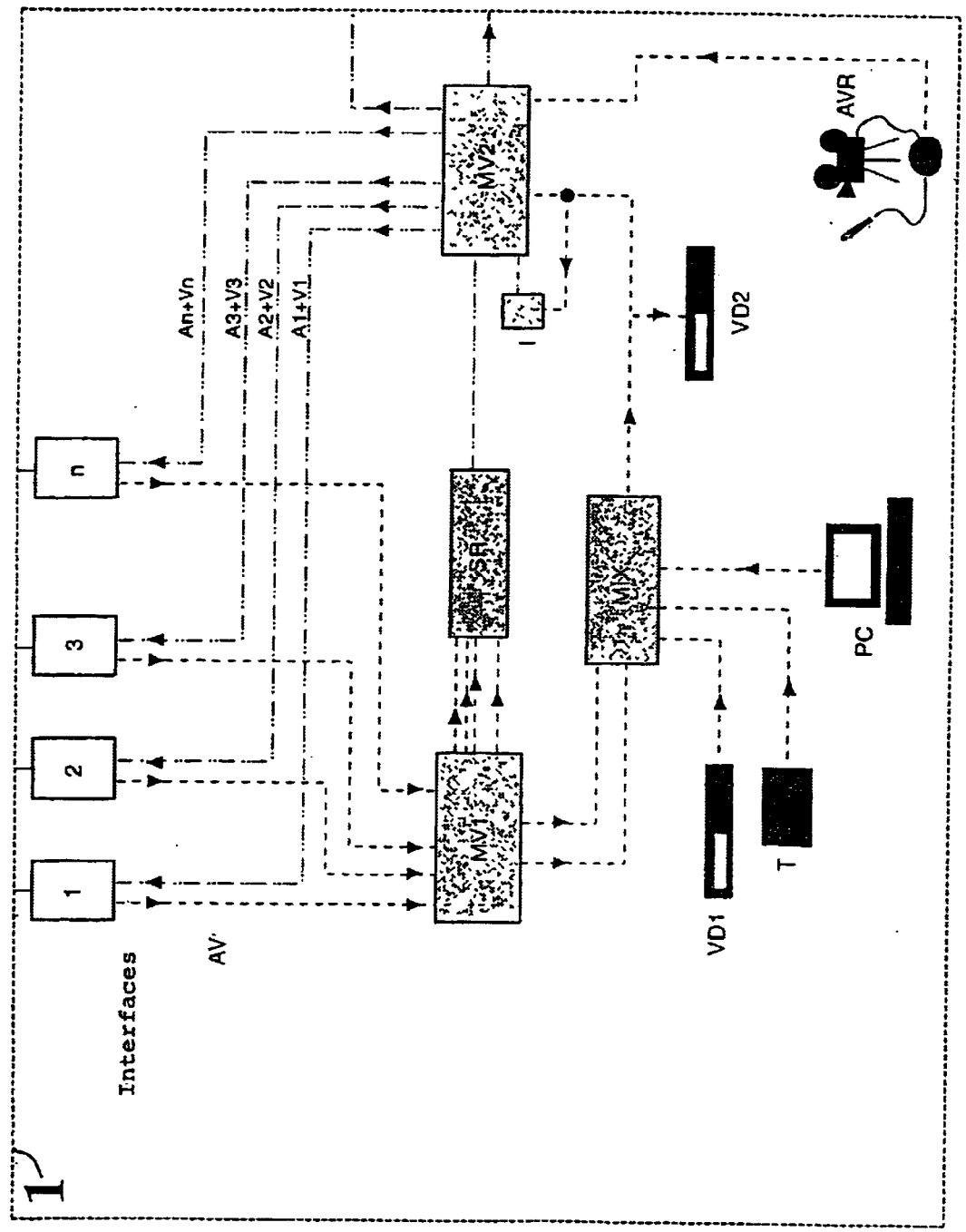
FIG. 1 schematically illustrates the parts making up the direction room according to the present invention.
Figure 2:
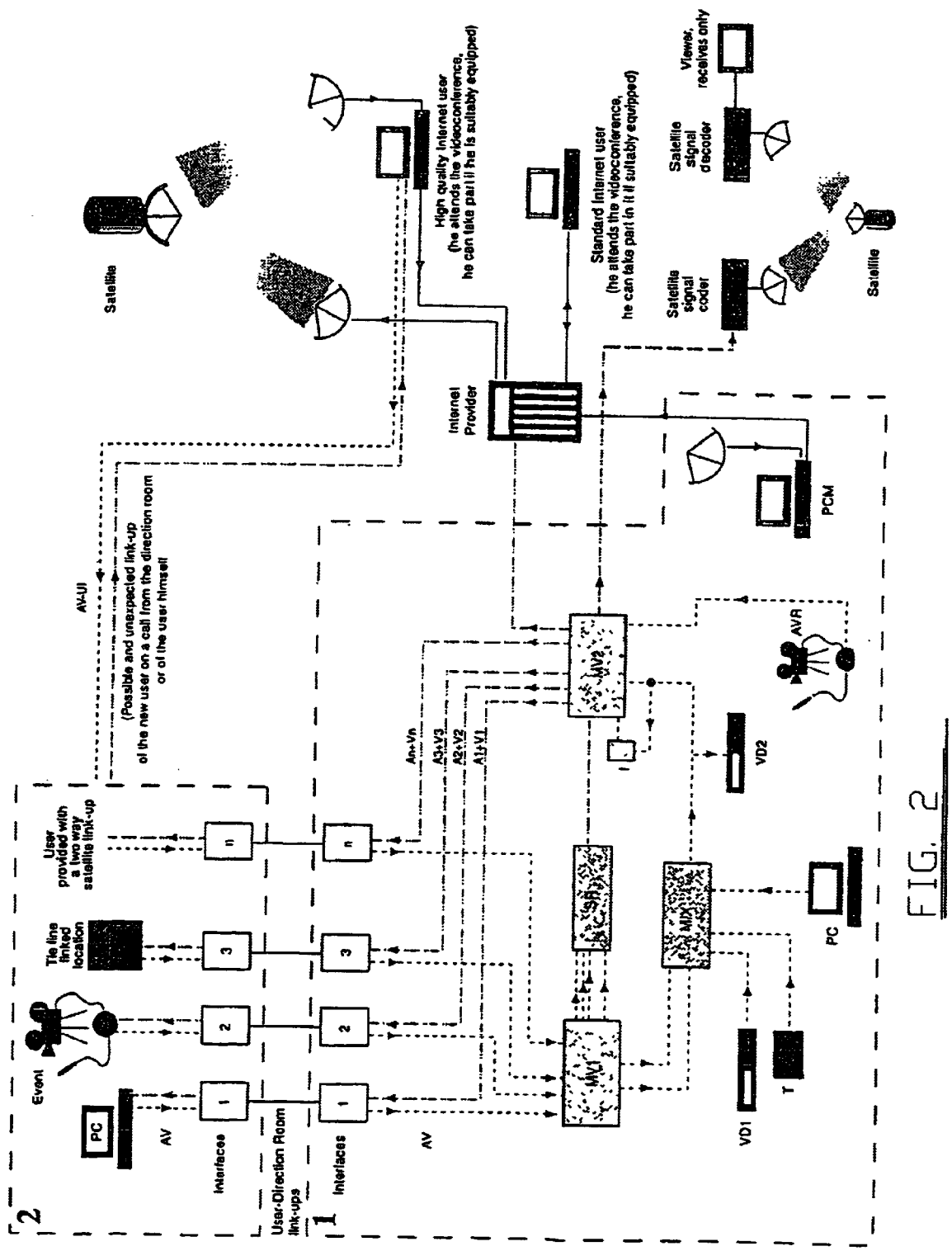

With reference to the abovementioned figures, the process object of the present invention comprises the following stages:

link-up in a direction room 1 with a plurality of remote and/or neighbour locations 2, which generate an audio video signal AV;

conversion, if necessary, of the audiovisual signal AV from every location, before its transfer from the place where it is generated to that where the direction room 1 is located, to adapt it to the type of connection and transmission which is employed;

reconversion of the received signal, if necessary, to an audio-video format, before its entrance to direction room 1;

selection of the signal/s to be used and sent, respectively, to the attendants and the speakers by an entrance audio-video matrix MV1;

addition of the necessary audiovideo contributions and effects, as well as of titles, soundtracks, commentaries, graphs, and so on, by mixer video MIX or computer with analogous functions:

selections of the processed audiovideo signals and their forwarding to the several remote locations 2, as a function of the fact that at that moment they are attendants or speakers.

According to a particular aspect of the process described above, while the attendants receive the audio video signal from the speaker, the latter will be capable of receiving a different audio signal which has been selected by the direction room.

For example, the speaker will be capable of receiving an overview of all the attendants or of some of them, just by using a device that selects the desired signals from the signals AV of the several locations and forwards them to the output audio video matrix for the following forwarding to the speaker.

Moreover, the speaker might have a graph that he is commenting to the attendants on his own screen, and these are bound to receive it full screen whilst seeing the image of the speaker himself superimposed or occupying a portion of the screen itself.

A second advantageous aspect of the present invention is that it is possible to send audio signal A coming from the speaker to an interpretation room I, wherein a simultaneous translation is carried out into the languages required by the attendants.

The signal that is sent to each attendant therefore consists of the video signal (V1, V2, . . . , Vn) ad hoc selected for him, to which a suitable audio signal has been associated (A1, A2, . . . ,An), therefore corresponding to the translation required by the user. It is obvious that more than one user can receive the same audio video signal AV.

Advantageously, according to the process that is herein described, it is also possible to record the audio video signal for an archive, just as it is watched by the attendants, that is with the audiovisual contributions and the television effects that have been added.

In so far as the apparatus apt to carry out the process so far described is concerned, within it there may substantially be envisaged a plurality of user-locations 2, which are remote and/or local, and of the multimedial or interactive type, possibly equipped with a codifier/decodifier, otherwise called CODEC, with an aggregator that transforms the analog audiovideo signal AV into a digital signal, and linked to a direction room 1 that exchanges a signal AV of the analog or digital audio visual type.

Said signal AV contains a bunch of information relative to the conference and the speaker or the speakers that are given the right to speak from time to time, as well as other auxiliary audiovisual information.

Said user-locations 2 comprise audio visual input/output means, such as for example computer or multimedial stations, tie-line linked-up locations, while the signal transmission between said locations and the direction room, and vice-versa, can take place regardless through (analog ond/or ISDN) telephone lines, which can themselves be aggregate or not, satellite transmission appliances, data transmission networks (including Internet), and so on.

The signal from each remote location 2, whether it be digital or analog, is converted into an audiovideo signal, while afterwards it is sent to an audio video matrix MV1 which deals with all the signals and gives one or more output signals.

From a strictly practical point of view, direction room 1 simultaneously receives signals AV from all users 2 connected to the video conference, and it further controls the audiovideo synchronism in each single channel and, if necessary, it suitably modifies it (any possible lacks of alignment can be generated by several components: transmission, channel aggregation, reconversion).

Signals AV coming from locations 2 are each visualised by a number of monitors and they are forwarded to audio-video matrix MV1.

The signals which have been selected are sent to a video mixer MIX, or computer with analogous functions, which is apt to act as an interface with a series of appliances like Personal Computers PC, Videotape recorders VD1, cameras, titlers T, audio equipment, and so on.

According to a peculiar aspect of the present invention, the employment of such video mixer MIX advantageously provides the addition to or the superimposition onto the videoconference signal, that is the signal coming from the speaker, a series of audiovisual contributions such as titles, subtitles, musical themes, soundtracks, audio and video fadings, slides and/or graphs.

Furthermore it is possible to visualise the name of the speaker that is talking in a certain definite moment, to carry out image superimpositions, to utilise and apply special effects and/or whatever other audiovisual contribution that makes the videoconference more versatile and adaptable to the needs of a specific moment.

This means that it is also possible to superimpose, back up with or create effects between the image of the speaker and films that support his talk, or graphs that he is creating himself and/or changing in that moment, and so on.

Advantageously, during a certain videoconference this makes it possible to emphasise moments of particular interest, and furthermore to underline relevant data during the talk, to highlight the aims to accomplish and/or particularly relevant news for the topic which is being dealt with.

Thus, the audio video signal which has been elaborated by the video mixer MIX or by a computer with analogous functions, is forwarded to a second audiovideo matrix MV2 and finally to a videotape recorder VD2 which records the videoconference.

This second audiovideo matrix MV2, or visual signal sorting-out device, supplies the audio-video signals to be sent to each single user 2, whether they be remote or local.

The two input and output commutation devices of the direction room (audio video matrices MV1, MV2 or analogous devices) ensure a total compatibility between different videocommunication systems, through said plurality of CODEC or specific interfaces, so as to make it possible to carry out transmissions involving apparati with technological features that made them incompatible so far. Moreover it is possible to use just one video matrix, if this is believed necessary by the direction room, in lieu of the two abovementioned ones.

As previosly properly highlighted, another peculiar feature of the present invention is given by the fact that it is possible to capture audio signal A before it reaches output audio video matrix MV2, so as to make it possible to have a simultaneous translation by one or more interpreters into the language or languages used by the attendants if these explicitly showed a need for it or if they made a clear request to the organisation.

In other words, audio signal A that is sent into interpretation room I for translation is then associated to video signal V at the output of the second audiovideo matrix MV2 in real time, in such a way that the translation or the translations are listened to by all the attendants that requested to be supplied with such a service.

Advantageously, according to the invention, direction 1 can intervene at any moment by using audiovideo matrices, substituting audiovideo signal AV which is forwarded to one or more remote or local attendants 2 with audio video signal AVR, accomplishing an "intercom" type communication while the users who are not interested keep attending the videoconference without any disruptions or interferences.

From what explained so far follows that signal AV which is elaborated by direction room 1 must be of the analog or digital audio video type: therefore the input and output signals, i.e directed to and coming from it, which are not audio video, must be transformed before their employment and finally reftransformed at the very moment when they are to be sent to remote attendants in the analog or digital form.

These two input and output conversions at the direction room, depend on the features of the link-up with the remote users, once again categorisable as digital or analogue, which can be carried out by means that the user believes more suitable: analogue, ISDN or aggregate ISDN telephone lines, satellite transmission, computer networks (such as Internet for example), and so on.

From what described so far, it appears to be rather clear that all the attendants to the videoconference receive the audio video signal from the person that is speaking. Advantageously though, by doubling all the incoming signals, on the speaker's screen there will be found to be shown the attendant to whom he is answering directly or with whom he intends to engage in a discussion, or in a cyclical fashion, that is all the participants to the conference (one by one or by groups, resorting to audio video multi-signal simultaneous combination devices).

To said signal which is forwarded to the speaker another signal can be added or substituted, this latter having been selected by the direction.

This is accomplished by a targeted or cyclical selection device SR, whose output signal is exclusively sent to the user that is at that moment playing the role of speaker,or otherwise to a group of users,; this is done by resorting to the second audio video matrix MV2 and whatever else is believed to be most suitable for that purpose by the direction.

It is useful to observe that a cyclical selection can take place at controllable time intervals, by dint of a timer-programmer or a computer for example.

According to another peculiar feature of the present invention, the director has the possibility of selecting the speaker who is scheduled to talk at that moment and who will be shown full screen to all the other speakers and/or attendants 2. Together with that, it is also possible to keep the audio channel of all or part of the attendants 2 active, enabling the apparatus to automatically visualise the participants that take part briefly and temporarily, in the form of windows or pointers (spots) suitably placed on the screen.

Another extremely advantageous aspect of the present invention is the possibility of transmitting the videoconference via Internet. By suitable (aggregate or tie-line) connections between the direction room and the Internet provider, it is possible to broadcast the audio video signal AV of the videoconference, that comes from the audio-video output matrix MV2, and whatever Internet user.

Furthermore, by a suitable discussion group, each single user can ask questions, show examples and actively take part in the debate.

The chairperson or the person in charge of the videoconference will be capable of visualising all the communications of the final users or attendants, by a computer PCM connected to the same discussion group.

He will be capable of ascertaining whether they are worth being addressed to one of the speakers that will be then able to answer through the channels and the already described modalities of the videoconference.

If on the other hand the chairman will believe it suitable to personally let the Internet user UI contribute to the videoconference, direction room 1 is capable of carrying out an unexpected but nonetheless possible telephone link-up AV-UI, turning the Internet user UI into an actor from spectator as he was, offering him a chance to come and take part in the conference just in the same manner as that given to the other participants that are connected (provided that said latecomer has the minimum equipment necessary for taking part in a videoconference which has the previously described modalities and features).

Advantageously, in the case of an Internet link-up, thanks to besides normal switch or ISDN telephone lines, the connection between the remote user and the provider can be carried out by dint of a mixed signal management system where the requests of the user are transmitted to the provider down the telephone lines, wkereas the audio video signal of the videoconference or of the data which have been required can be received via satellite, leading to a drastic improvement of quality and increasing the speed of reception regardless of the traffic on the network and of the amount of users connected to it at that very moment.

Furthermore, using the Internet, it is possible to carry out transmission and data file exchange, regardless of the type of data therein contained, in a manner which is absolutely compatible with any type of computer or computer system.

Said remote or neighbour locations 2 may also comprise a camera and a microphone which are apt to send the audiovisual signal from a certain event like a parade or a sports match, to direction room 1 that is going to manage it in the most suitable manner.

According to the present invention, it is possible to conduct even very "intense" debates between a limited number of participants, avoiding frequent image changes; this is accomplished by subdividing the screen into adjacent windows and enabling the audio of the entire discussion group. In this case there are found to be shown only those who are part of said restricted group of people on the screen and at the same time.

It is useful to notice that using CODECs, it is possible to control remote cameras based at locations 2. This means that the staff in the direction room is capable of showing or zooming details at their own discretion, by sending suitable directions that are bound to be executed by the camera located at the user's location.

In particular cases, it is finally possible to envisage link-ups between direction room 1 and the users exclusively via satellite.

The present invention can also be applied to other fields such as: conferences, training and refresher courses, sales, advertising, consultancy services, tourism and others.

The present invention has been described and illustrated according to one preferred embodiment, but it holds that whoever skilled in the art may well amend or change it without stepping out of the scope of the present patent.

What is claimed is:

1. A process for carrying out and managing a videoconference among a plurality of user locations, the process comprising the steps of:

linking a direction room to a plurality of user locations from which audiovisual signals originate;

converting the audiovisual signals from their respective signal formats to at least one transmission signal format before transmission of the audiovisual signals to the direction room and then transmitting the audiovisual signals from the user locations to the direction room using the at least one transmission signal format;

prior to using the audiovisual signals at the direction room, converting all of the received audiovisual signals into a common audio video format;

at the direction room, selecting the audiovisual signals in the common audio video format to send to the user locations employing an input audio video matrix;

adding further information in the common audio video format to the selected audiovisual signals to form complete outgoing signals in the common audio video format; and converting the complete outgoing signals from the common audio video format to the at least one transmission signal format before transmission of the complete outgoing signals to the user locations and then transmitting the complete outgoing signals from the direction room to the user locations using the at least one transmission signal format, wherein the selecting step selects a first complete outgoing signal to a speaker at a videoconference and selects a second complete outgoing signal different from the first complete outgoing signal for videoconference attendees other than the speaker, and wherein the speaker receives an overview of the attendees by employment of a selection device that selects one or more signals from among the user locations and routes the selected signals through the input audio video matrix for delivery to the speaker.

2. The process of claim 1, wherein the further information comprises at least one of audio effects, video effects, a title, a soundtrack, a comment, an image, and a graph.

3. The process of claim 1, wherein the speaker is receives a graph and the attendees receive the graph and an image of the speaker.

4. The process of claim 1, wherein speech from a speaker is translated after the adding step and before the converting step and the translated speech is put in the common audio video format and added to the outgoing signal.

5. The process of claim 1, further comprising the step of recording the complete outgoing signal for an archive.

* * * * *